United States Patent [19]

Shinpo

[11] Patent Number: 4,766,636
[45] Date of Patent: Aug. 30, 1988

[54] WIPER BLADE HAVING FLOATING SUPPRESSING STRUCTURE

[75] Inventor: Yuji Shinpo, Fujisawa, Japan

[73] Assignee: Nissan Motor Co., Ltd., Yokohama, Japan

[21] Appl. No.: 94,778

[22] Filed: Sep. 10, 1987

[30] Foreign Application Priority Data

Sep. 13, 1986 [JP] Japan ................................ 61-216851
Dec. 8, 1986 [JP] Japan ............................ 61-188729[U]

[51] Int. Cl.⁴ .............................................. B60S 1/02
[52] U.S. Cl. .................................. 15/250.42; 15/250.2
[58] Field of Search ............... 15/250.2, 250.35–250.42

[56] References Cited

U.S. PATENT DOCUMENTS 3,037,233 6/1962 Peras et al. ............... 15/250.36 X
3,317,946 5/1967 Anderson .......................... 15/250.42

FOREIGN PATENT DOCUMENTS 0120261 10/1984 European Pat. Off. .
57-928 1/1982 Japan .
2106775 4/1983 United Kingdom .
2145928 4/1985 United Kingdom .
2146891 5/1985 United Kingdom .
2180144 3/1987 United Kingdom .

Primary Examiner—Peter Feldman
Attorney, Agent, or Firm—Foley & Lardner, Schwartz, Jeffery, Schwaab, Mack, Blumenthal & Evans

[57] ABSTRACT

Herein disclosed is a wiper blade which is constructed to suppress or at least minimize undesirable wiper blade floating phenomemon which would occur during high speed cruising of a vehicle in the rain. The wiper blade comprises a main lever detachably connected to a wiper arm and having a longitudinally extending ridge portion, sub-levers aligned along the main lever and pivotally connected to the same, and an elongate blade rubber held by the sub-levers and extending along the main lever. The main lever is formed with a substantially flat wall which extends from one side of the ridge portion toward the blade rubber to such a degree as to partially cover the same, and the ridge portion is formed with a plurality of openings.

15 Claims, 7 Drawing Sheets

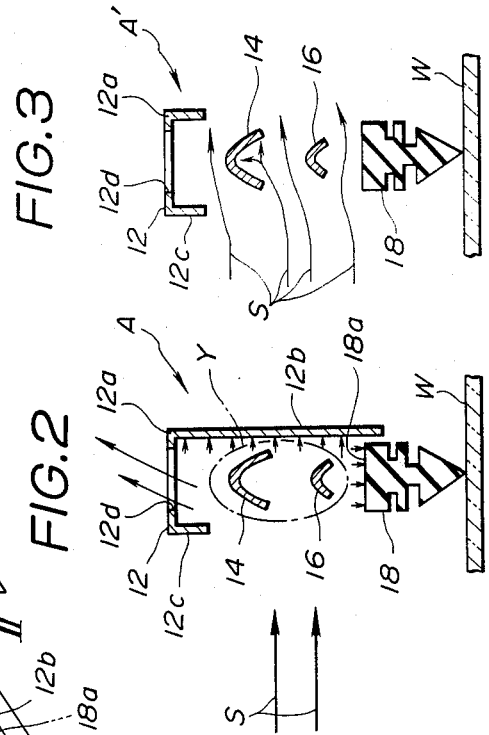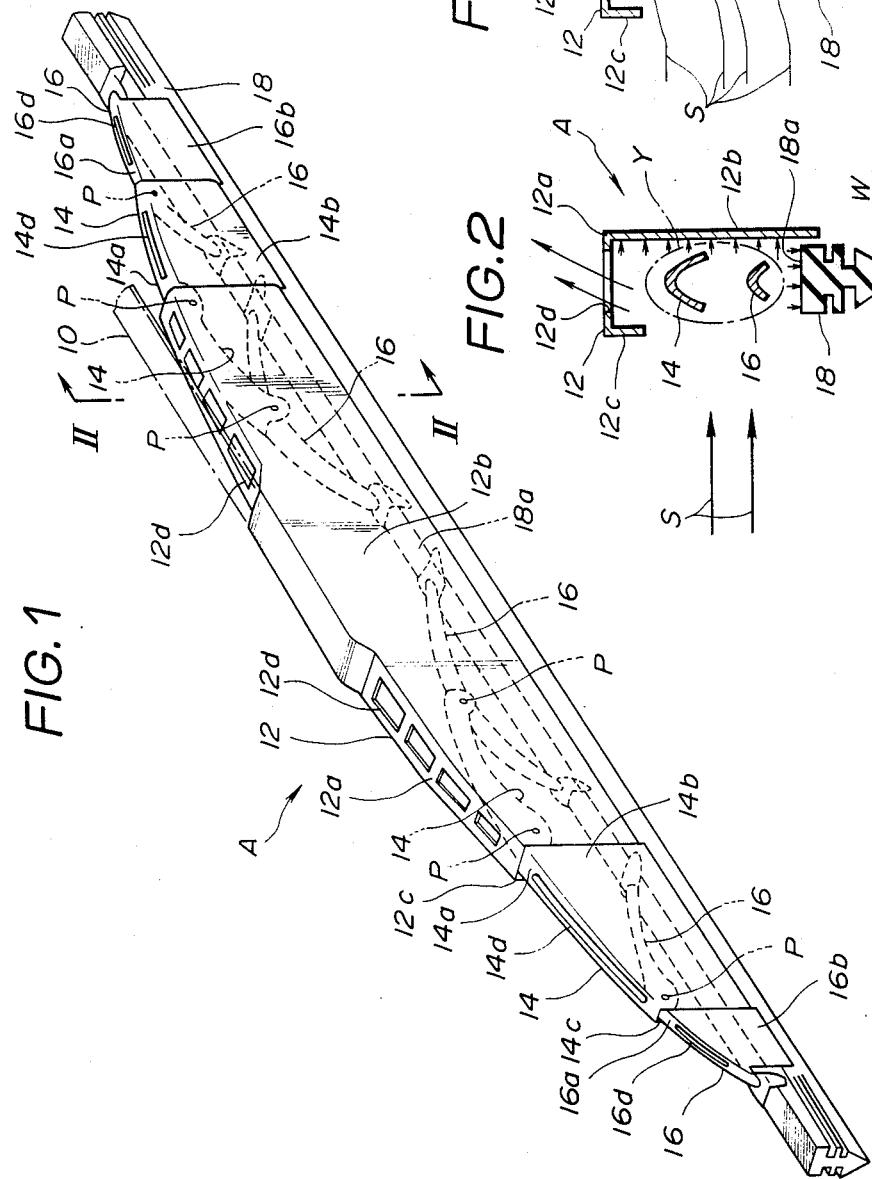

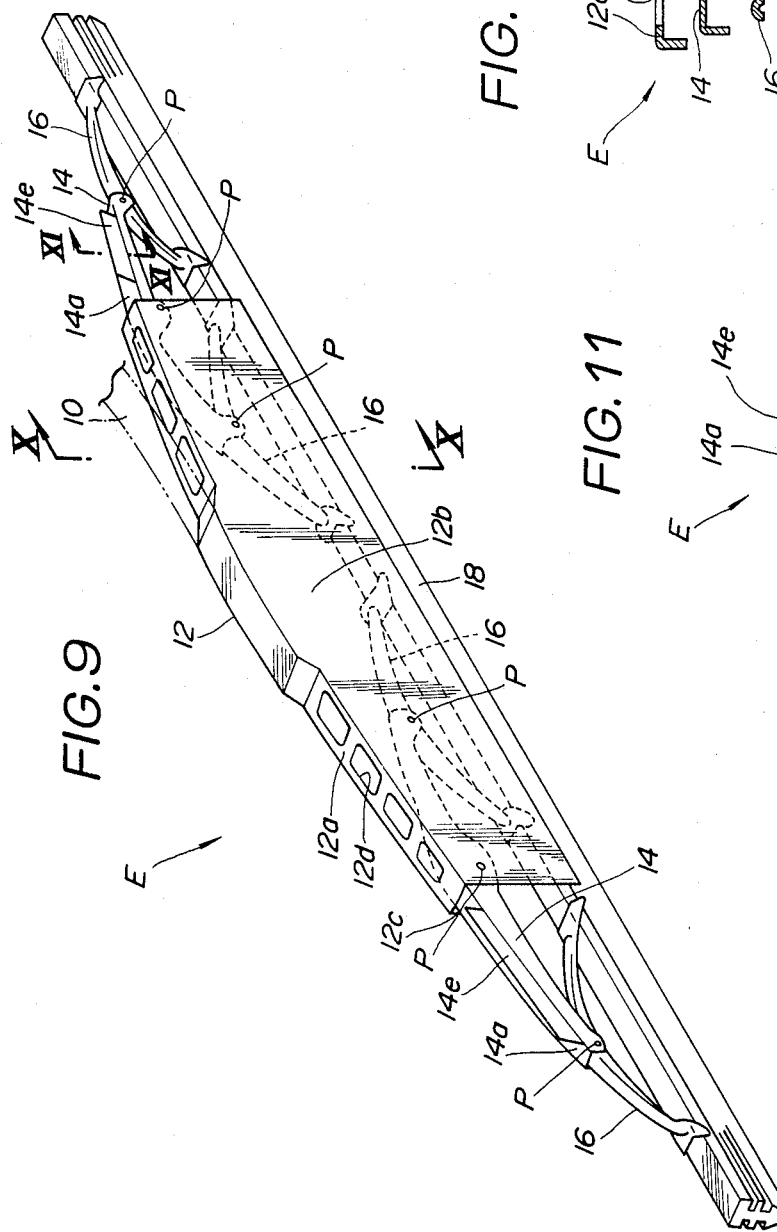

WIPER BLADE HAVING FLOATING SUPPRESSING STRUCTURE

BACKGROUND OF THE INVENTION

1. Field of the Invention

The present invention relates in general to a windshield wiper for automobiles, and more particularly to a wiper blade which is constructed to suppress or at least minimize undesirable wiper blade floating phenomenon which would occur during high speed cruising of the vehicle in the rain.

2. Description of the Prior Art

During high speed cruising of automibiles in the rain, the wiper blades of the windshield tend to float or rise from the windshield, against a biasing force applied thereto, due to an inevitable air stream running downstreamly along the inclined windshield. This floating phenomenon brings about a poor contact of the wiper blades with the windshield and thus causes a poor wiping operation of the wiper blades. In view of this, various kinds of wiper blades have been hitherto proposed and put into practical use for the purposes of eliminating or at least minimizing the above-mentioned drawbacks. One of them is shown in Japanese Patent First Provisional Publication No. 57-928.

However, some of the conventional wiper blades including the wiper blade of the publication have failed to exhibit satisfied performance because of their inherency in construction.

SUMMARY OF THE INVENTION

It is therefore an essential object of the present invention to provide a wiper blade which is constructed to suppress or at least minimize the undesirable floating phenomenon.

According to the present invention, there is provided a wiper blade adapted to be fixed to a wiper arm, which comprises a main lever detachably connected to the wiper arm and having a longitudinally extending ridge portion; sub-levers aligned along the main lever and pivotally connected to the same; an elongate blade rubber held by the sub-levers and extending along the main lever; first means providing the main lever with a substantially flat wall which extends from one side of the ridge portion toward the blade rubber to such a degree as to partially cover the same; and second means providing the ridge portion with a plurality of openings.

BRIEF DESCRIPTION OF THE DRAWINGS

FIG. 1 is a perspective view of a wiper blade of a first embodiment of the present invention;

FIG. 2 is an enlarged sectional view taken along the line II—II of FIG. 1

FIG. 3 is a view similar to FIG. 2, but showing a conventional wiper blade;

FIG. 9 is a perspective view of a wiper blade of a fifth embodiment of the present invention;

FIG. 10 is a sectional view taken along the line X—X of FIG. 9;

FIG. 11 is a sectional view taken along the line XI—XI of FIG. 9;

DETAILED DESCRIPTION OF THE INVENTION

Figure 4:
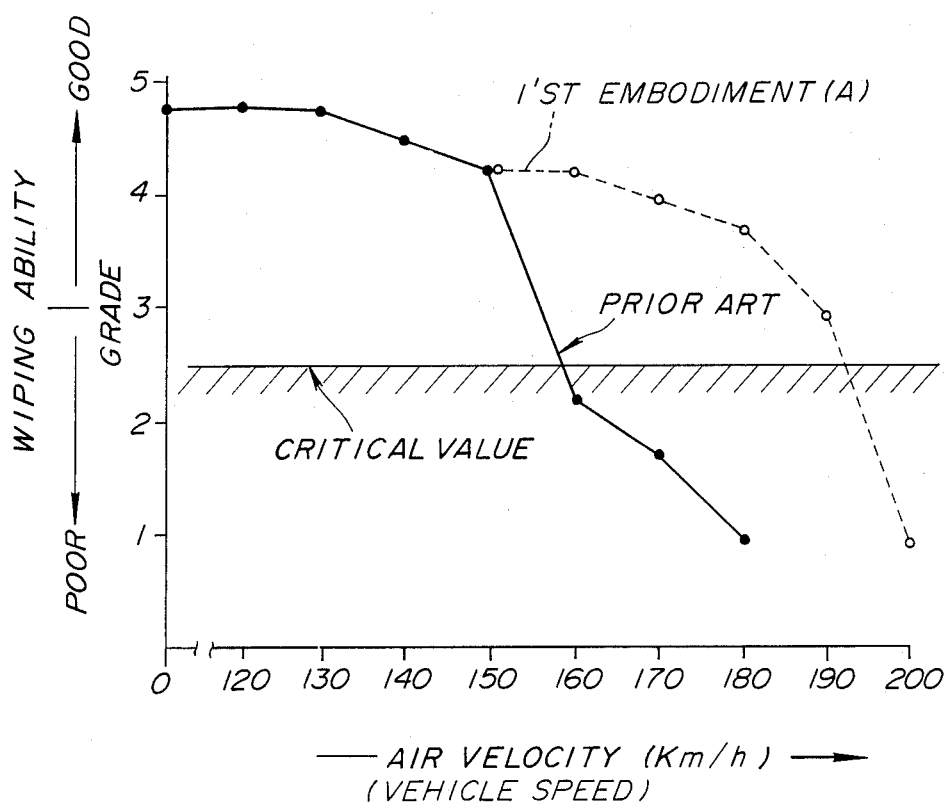
FIG. 4 is a graph depicting the wiping ability of the wiper blade of the first embodiment, comparing with that of the conventional wiper blade.

Throughout the specification and drawings, like parts and constructions are denoted by the same numerals.

Referring to FIGS. 1 and 2, particularly FIG. 1, there is shown a wiper blade of a first embodiment of the present invention, which is generally denoted by reference "A". The wiper blade "A" is detachably attached to a wiper arm 10 and comprises generally a primary or main lever 12 attached to the wiper arm 10, two secondary levers 14 each being pivotally connected at "P" to one end of the primary lever 12 and four tertiary levers or yokes 16 each being pivotally connected at "P" to one end of each secondary lever 14. An elongate blade rubber 18 is held by opposed ends of each tertiary lever 16 in a known manner.

As is seen from the drawings, the primary lever 12 comprises a gently curved ridge portion 12a, a flat wall portion 12b extending at right angles from one side of the ridge portion 12a and a flange portion 12c extending at right angles from the other side of the ridge portion 12a. The flat wall portion 12b extends toward the blade rubber 18 to such a degree as to partially cover or conceal the blade rubber 18 in an overlapping manner. The construction of the primary lever 12 may be easily understood from the drawing of FIG. 6.

Each of the secondary levers 14 comprises a gently curved ridge portion 14a, a flat wall portion 14b extending at right angles from an outside half of one side of the ridge portion 14a and a flange portion 14c extending at right angles from the other side of the ridge portion 14a. Similar to the secondary lever 14, the outside two of the tertiary levers 16 each comprise a gently curved ridge portion 16a, a flat wall portion 16b extending at right angles from an outside half of one side of the ridge portion 16a and a flange portion (no numeral) extending at right angles from the other side of the ridge portion 16a.

The ridge portion 12a of the primary lever 12 is formed at its longitudinally opposed portions with a plurality (eight in the disclosed embodiment) of aligned openings 12d. Furthermore, the ridge portions 14a and 16a of the secondary and tertiary levers 14 and 16 are formed with elongate openings 14d and 16d respectively. The longitudinal both ends of the primary lever 12 spacedly cover the inside sections of the walled portions 14b of the secondary levers 14, and the outside end portions of the secondary levers 14 spacedly cover the inside sections of the walled portions 16b of the tertiary levers 16. Thus, when the wiper blade "A" is pressed against a curved windshield "W", the blade rubber 18 of the same is gently flexed in accordance with the curvature of the windshield "W" without making interference between the overlapped portions of the primary and secondary levers 12 and 14 and between the overlapped portions of the secondary and tertiary levers 14 and 16.

It is to be noted that when, due to standstill of the windshield wiper, the wiper blade "A" assumes its horizontal rest or concealed position, the same is so oriented that the flat wall portions 12b, 14b and 16b are positioned above the flanges 12c, 14c and 16c. That is, under this rest condition, the flat wall portions face upward with the flanges facing downward. Thus, the up and down positional relationship between the flat wall portions and the flanges is kept unchanged while the wiper blade "A" is placed in a zone between the horizontal rest position and its top or upright position on the windshield "W".

In the following, advantageous phenomena given by the wiper blade "A" of the invention will be described with reference to FIG. 2. For ease of understanding, let it be supposed that the wiper blade "A" assumes an angular position slightly above the horizontal rest position during cruising of the vehicle in the rain.

During the vehicle cruising, there is inevitably produced air stream "S" which runs upward along the inclined surface of the windshield "W". The air stream "S" collides against the flat wall portions 12b, 14b and 16b of the wiper blade "A" producing air stagnation in the wiper blade "A". The air stagnation causes generation of positive pressure area "Y" in the wiper blade because of air streams running constantly around the wiper blade "A". Because of provision of the positive pressure area "Y", the upper surface 18a of the blade rubber 18 is pressed toward the windshield "W". Furthermore, because of counteraction effected as a result of air flow through the openings 12d, 14d and 16d of the primary, secondary and tertiary levers, there is produced a force by which the entire of the wiper blade "A" is pressed toward the windshield "W". It will be easily gussed that similar phenomena will occur during the time for which the wiper blade "A" is under pivoting movement between the horizontal rest position and the top position on the windshield. Thus, the undesirable floating phenomenon of the wiper blade is eliminated or at least minimized. The floating suppressing action has been prooved by testing the performance of a wiper blade "A'" of FIG. 3 which has no means corresponding to the flat wall portions 12b, 14b and 16b of the wiper blade "A" of the invention.

That is, when the two wiper blades "A" and "A'" were subjected to a lift measuring test in a wind tunnel through which air flowed at a speed of 120 km/h, a result was obtained wherein the lift of the former was about 30 grams while that of the latter was about 120 grams. It is to be noted that less value of the lift means more reliable contact between the blade rubber 18 and the windshield "W".

When the two wiper blades "A" and "A'" were subjected to a windshield wiping test in the wind tunnel sprinkling water over the windshield in order to measure the critical speed of the vehicle at which a forward visibility through the windshield is barely maintained, such a result as depicted by the graph of FIG. 4 was obtained. As is seen from this graph, the critical speed obtained through the wiper blade "A" of the invention was about 190 km/h, while the speed obtained through the conventional wiper blade "A'" was about 160 km/h. This means that the windshield wiping ability of the wiper blade "A" is higher than that of the conventional one "A'" by a degree corresponding to 30 km/h of the vehicle speed.

Figure 5:
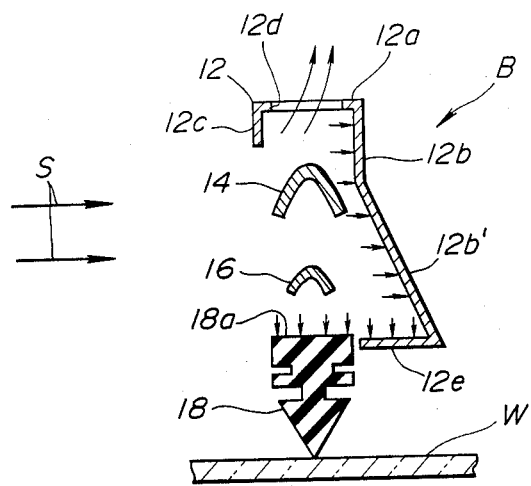
FIG. 5 is a view similar to FIG. 2, but showing a second embodiment of the present invention.

Referring to FIG. 5, there is shown a wiper blade of a second embodiment of the present invention, which is generally denoted by reference "B". The wiper balde "B" of this embodiment is generally the same as the afore-mentioned wiper blade "A" of the first embodiment except for the construction of the primary lever 12. That is, as is seen from the drawing, the wall portion 12b of the primary lever 12 has a lower part 12b' bent outwardly, and the lower part 12b' has a flange 12e which extends toward the blade rubber 18. Experiments have revealed that the force for pressing the blade rubber 18 against the windshield "W" is increased by a degree corresponding to the area of the flange 12e.

Figure 6:
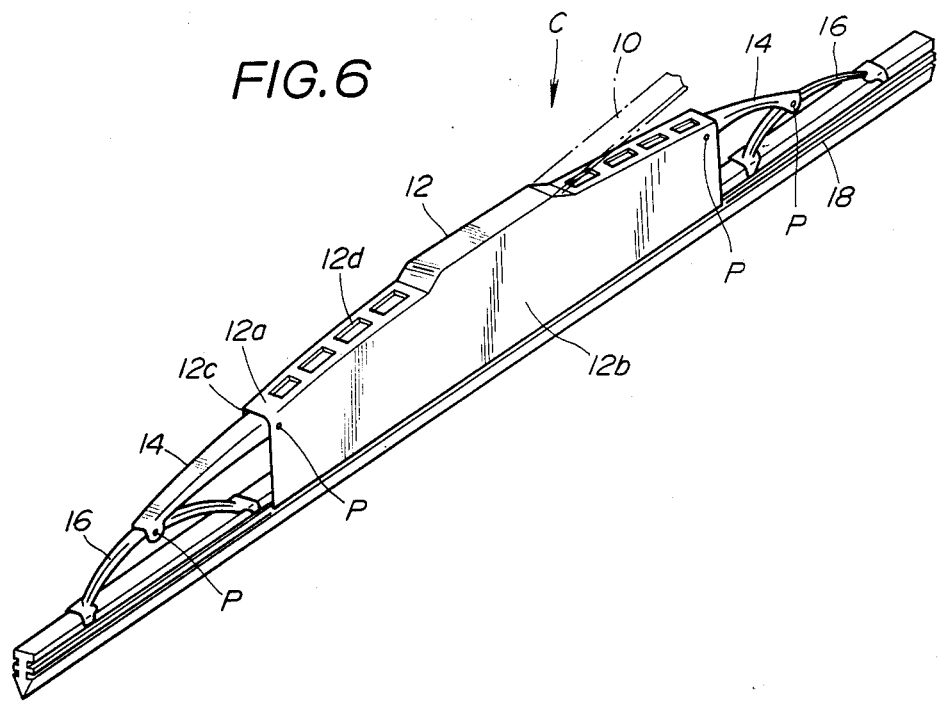
FIG. 6 is a perspective view of a wiper blade of a third embodiment of the present invention.

Referring to FIG. 6, there is shown a wiper blade of a third embodiment of the present invention, which is generally designated by reference "C". In this third embodiment, only the primary lever 12 is formed with the flat wall portion 12b, and the secondary and tertiary levers 14 and 16 have no aperture means corresponding to the openings 14d and 16d of the first embodiment.

Figure 7:
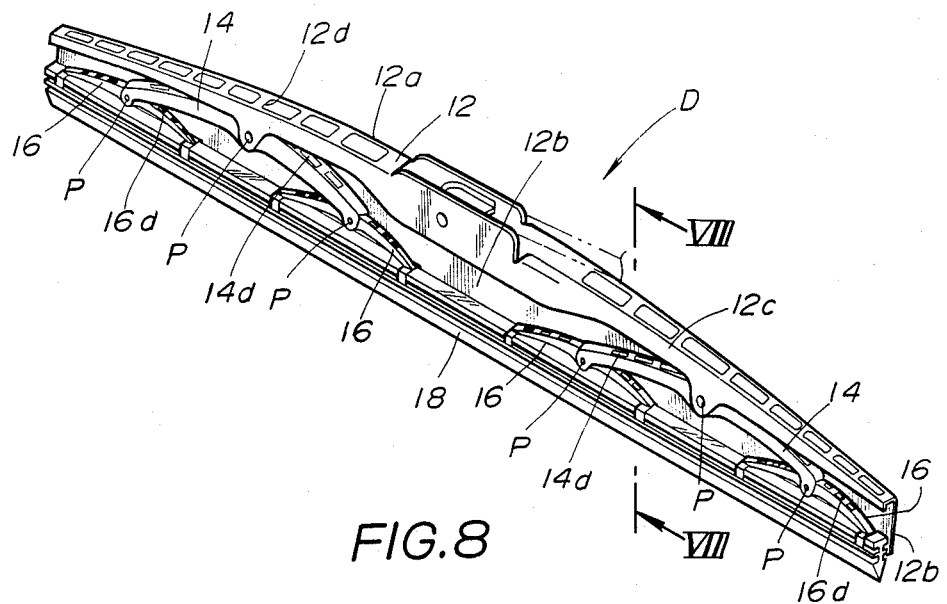
FIG. 7 is a view similar to FIG. 6, but showing a fourth embodiment of the present invention.
Figure 8:
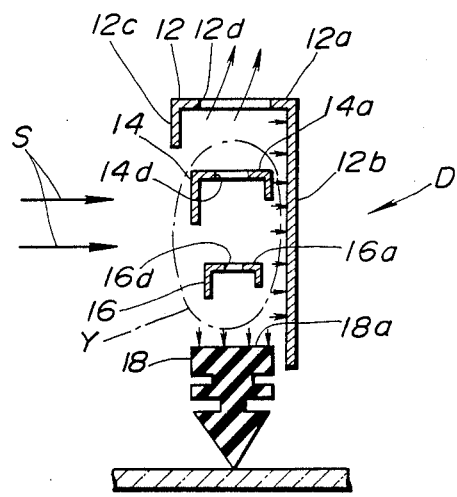
FIG. 8 is an enlarged sectional view taken along the line VIII—VIII of FIG. 7.

Referring to FIGS. 7 and 8, particularly FIG. 7, there is shown a wiper blade of a fourth embodiment of the present invention, which is generally designated by reference "D". The wiper blade "D" of this embodiment comprises an elongate primary lever 12, two secondary levers 14 each being pivotally connected to the primary lever 12 at "P" distant from one end of the same, and four tertiary levers 16 each being pivotally connected at "P" to one end of each secondary lever 14. As is seen from FIG. 7, the primary lever 12 has a sufficient length to cover the assembly of the secondary and tertiary levers 14 and 16, and comprises a gently curved ridge portion 12a, a flat wall portion 12b extending at right angles from one side of the ridge portion 12a toward the blade rubber 18, and a flange portion 12c extending at right angles from the other side of the ridge portion 12a. The flat wall portion 12b extends along the ridge portion 12a therethroughout. The primary, secondary and tertiary levers 12, 14 and 16 are all formed at their ridge portions with aligned openings 12d, 14d and 16d, respectively. It is to be noted that in this fourth embodiment, only the primary lever 12 is formed with the flat wall portion 12b. Because of substantially the same reasons as mentioned in the first embodiment, the undesired wiper blade floating phenomenon is suppressed or at least minimized in this fourth embodiment.

Referring to FIGS. 9 to 11, particularly FIG. 9, there is shown a wiper blade of a fifth embodiment, which is generally designated by reference "E". The wiper blade "E" of this embodiment is substantially the same as the wiper blade "C" of the afore-mentioned third embodiment (FIG. 6) except for the construction of the secondary lever 14. That is, in the fifth embodiment, each secondary lever 14 is formed at the ridge portion 14a thereof with a wing 14e which extends along the exposed outer portion of the ridge portion 14a. As is seen from FIG. 9, each wing 14e is inclined toward an imaginary plane which includes the flat wall portion 12b of the primary lever 12. More specifically, as is seen from FIG. 11, the angle of the wing 14e relative to the ridge portion 14a may be within a range from 30 degrees to 90 degrees, and the width of the wing 14e is preferably about 10 mm.

Figure 12:
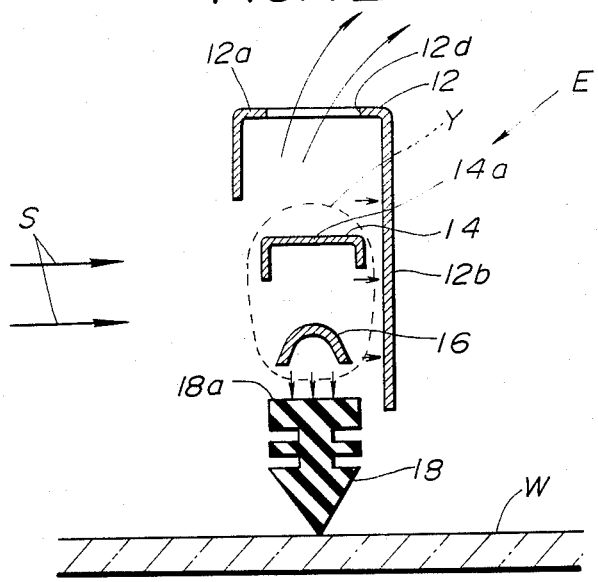
FIG. 12 is an enlarged sectional view of the wiper blade of the fifth embodiment, depicting the condition wherein the wiper blade is suitably pressed against a windshield.

FIG. 12 is an illustration for showing an advantageous phenomenon given by the wiper blade "E" of the fith embodiment during cruising of the vehicle in the rain. Similar to the case of the afore-mentioned first embodiment "A", a considerable biasing force is applied to the wiper blade "E" during the cruising thereby suppressing or at least minimizing the undesired wiper blade floating phenomenon.

Figure 13:
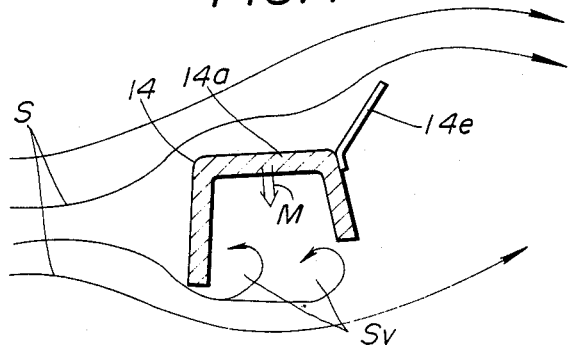
FIG. 13 is an enlarged sectional view of a wing-mounted secondary lever employed in the wiper blade of the fifth embodiment, depicting air stream produced near the secondary lever.

Advantages given by the provision of the wings 14e on the secondary lever 14 will be described with reference to FIGS. 13 to 15. FIG. 13 shows a secondary lever 14 having a wing 14e secured thereto, while, FIG. 14 shows a secondary lever 14 having no wing.

Figure 14:
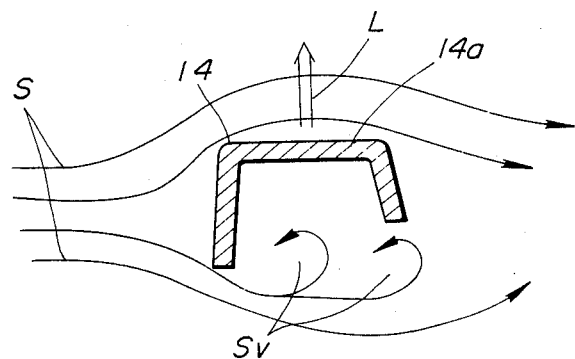
FIG. 14 is a view similar to FIG. 13, but showing a case wherein the secondary lever is not provided with a wing.
Figure 15:
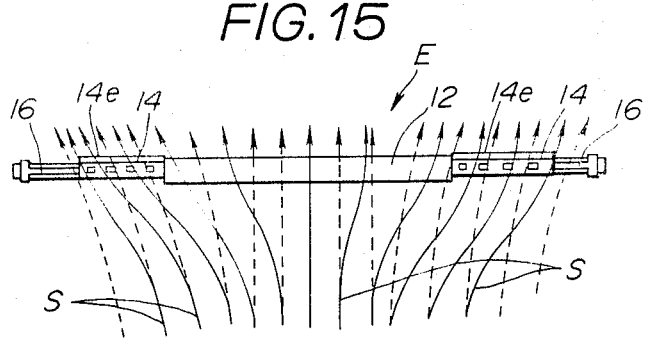
FIG. 15 is a plan view of the wiper blade of the fifth embodiment, depicting the air stream flowing therethrough.

As is seen from FIG. 14, when air stream "S" goes through the secondary lever 14 which has no wing, an upper part of the air stream is forced to curve at an upper side of the lever 14 increasing its velocity, while a lower part of the stream is forced to produce vortexes "Sv" at a lower side of the lever 14. These phenomena cause generation of negative pressure areas at both the upper and lower sides of the lever 14. However, since, in general, the negative pressure produced by the increase in air stream velocity is higher than that produced by the vortexes, a considerable lift "L" is generated in the secondary lever 14 during cruising of the vehicle. While, as is seen from FIG. 13, in case of the secondary lever 14 having the wing 14e, the provision of the wing 14e prevents the air stream "S" from producing the high velocity area at the upper side of the lever 14, so that the secondary lever 14 is biased in the direction of the arrow "M", that is, toward the windshield.

In general, the force for biasing the lever 14 toward windshield is proportional to the square of velocity of air stream passing through the wing 14e. As is shown in FIG. 15, while the wiper blade "E" is being exposed to air stream "S" during cruising of the vehicle, part of the air stream "S" which has been directed toward the middle portion of the blade "E" is forced to curve sidewards, that is, toward the wings 14e of the secondary levers 14 because of the provision of the flat wall portion 12b, which acts as a so-called air shutter, of the primary lever 12. Curving the air stream "S" in such direction induces an increase in air flow velocity at the wings 14e thereby much more increasing the biasing force applied to the secondary levers 14, that is, to the wiper blade "E". Because such biasing force is assured even when the wings 14e are considerably small in size, the forward visibility through the windshield is not deteriorated so bad.

Figure 16:
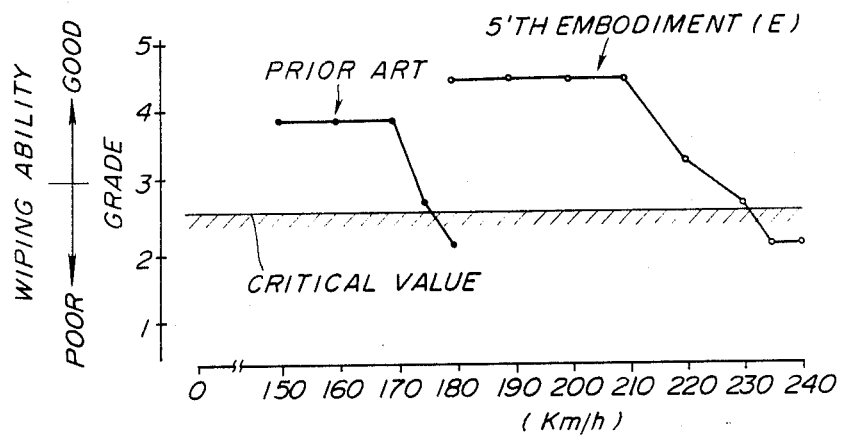
FIG. 16 is a graph showing the wiping ability of the wiper blade of the fifth embodiment, comparing with that of a conventional wiper blade.

When the wiper blade "E" of the fifth embodiment was subjected to a windshield wiping test in the wind tunnel sprinkling water over the windshield, the critical speed of the vehicle was about 230 km/h as is depicted in the graph of FIG. 16.

Figure 17:
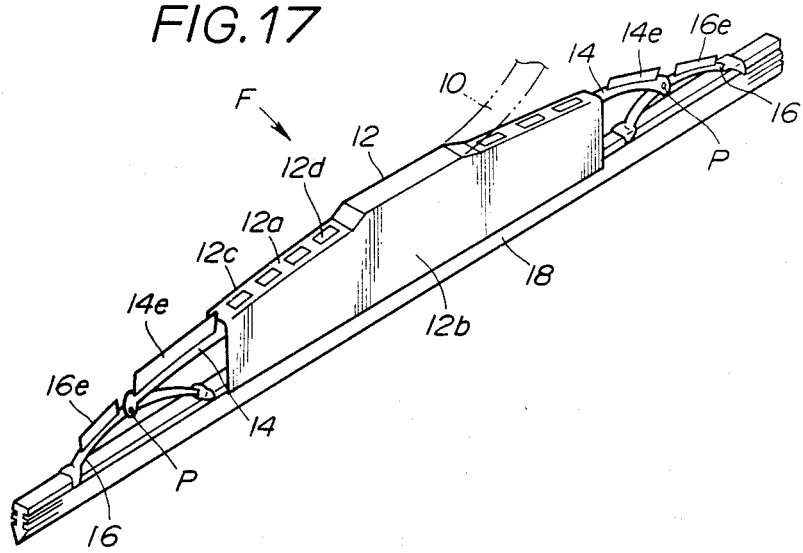
FIG. 17 is a perspective view of a wiper blade of a sixth embodiment of the invention.

Referring to FIG. 17, there is shown a wiper blade of a sixth embodiment of the present invention, which is generally designated by reference "F". In this embodiment, the wings 16e are formed on the tertiary levers 16 as well as the secondary levers 14 in order to assure the floating suppressing action of the wiper blade.

What is claimed is:

1. A wiper blade adapted to be fixed to a wiper arm, comprising:
   a main lever detachably connected to said wiper arm and having a longitudinally extending ridge portion;
   sub-levers aligned along said main lever and pivotally connected to the same;
   an elongate blade rubber held by said sub-levers and extending along said main lever;
   first means providing said main lever with a substantially flat wall which extends from one side of said ridge portion toward said blade rubber to such a degree as to partially cover or cancel the same in an overlapping manner; and
   second means providing said ridge portion with a plurality of openings.

2. A wiper blade as claimed in claim 1, in which said flat wall is integral with said ridge portion.

3. A wiper blade as claimed in claim 2, in which said flat wall extends from said ridge portion at substantially right angles.

4. A wiper blade as claimed in claim 3, in which said ridge portion is formed at the other side thereof with a flange which extends in the same direction as said flat wall.

5. A wiper blade as claimed in claim 4, in which said flat wall has a lower part bent in a direction away from said blade rubber, and in which said lower part has a flange which extends toward said blade rubber.

6. A wiper blade as claimed in claim 4, in which said flat wall has a size to sufficiently conceal the sub-levers.

7. A wiper blade as claimed in claim 6, in which each of said sub-levers is formed at a ridge portion thereof with aligned openings.

8. A wiper blade as claimed in claim 4, in which said flat wall of said main lever has a size to partially conceal the sub-levers.

9. A wiper blade as claimed in claim 8, in which said flat wall of the main lever conceals the inside positioned sub-levers having the outside positioned ones exposed to the open air.

10. A wiper blade as claimed in claim 9, in which each of said outside positioned sub-levers comprises:
    a longitudinally extending ridge portion;
    a substantially flat wall extending at substantially right angles from one side of said ridge portion toward said blade rubber to such a degree as to partially cover the same; and
    a flange extending at substantially right angles from the other side of said ridge portion toward said blade rubber.

11. A wiper blade as claimed in claim 10, in which said ridge portions of the outside positioned sub-levers are formed with openings, respectively.

12. A wiper blade as claimed in claim 9, in which selected ones of said sub-levers are formed on said ridge portions with respective wings which are inclined toward an imaginary plane which includes said flat wall of said main lever.

13. A wiper blade as claimed in claim 9, in which all of the outwardly exposed sub-levers are formed at the ridge portions thereof with respective wings which are inclined toward an imaginary plane which includes a flat wall of said main lever.

14. A wiper blade as claimed in claim 12, in which an angle of said wing relative to the ridge portion is within a range from 30 degrees to 90 degrees.

15. A wiper blade as claimed in claim 1, in which said sub-levers comprise:

two secondary levers which are pivotally connected to spaced portions of said main lever; and four tertiary levers, each two being pivotally connected to spaced portions of one of said secondary levers.

* * * * *